(12) United States Patent
Toyoda et al.

(10) Patent No.: US 8,771,824 B2
(45) Date of Patent: Jul. 8, 2014

(54) ULTRAVIOLET-CURABLE COMPOSITION FOR INKJET AND RECORDING MATERIAL

(71) Applicant: Seiko Epson Corporation, Tokyo (JP)

(72) Inventors: Naoyuki Toyoda, Nagano (JP); Masaya Shibatani, Nagano (JP); Minoru Yamada, Nagano (JP); Tomohiro Ogawa, Nagano (JP); Hidekazu Moriyama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/738,294

(22) Filed: Jan. 10, 2013

(65) Prior Publication Data

US 2013/0196126 A1    Aug. 1, 2013

(30) Foreign Application Priority Data

Feb. 1, 2012   (JP) .................. 2012-020355

(51) Int. Cl.
*B32B 3/00* (2006.01)

(52) U.S. Cl.
USPC .......... 428/195.1; 428/208; 347/100

(58) Field of Classification Search
USPC ................... 428/195.1, 208; 347/100
See application file for complete search history.

(56) References Cited

U.S. PATENT DOCUMENTS

| 2008/0081124 | A1 | 4/2008 | Sano et al. |
| 2009/0280302 | A1 | 11/2009 | Fukumoto et al. |
| 2009/0293766 | A1 | 12/2009 | Kamikoriyama et al. |
| 2010/0183809 | A1 | 7/2010 | Oyanagi et al. |
| 2010/0194836 | A1 | 8/2010 | Prolss et al. |
| 2010/0256284 | A1 | 10/2010 | Kagata et al. |
| 2012/0295076 | A1* | 11/2012 | Toyoda et al. ............ 428/195.1 |
| 2012/0295082 | A1* | 11/2012 | Toyoda et al. ............ 428/208 |

FOREIGN PATENT DOCUMENTS

| JP | 07-026185 A | 1/1995 |
| JP | 2008-088228 A | 4/2008 |
| JP | 2009-057548 A | 3/2009 |
| JP | 2010-168412 A | 8/2010 |
| JP | 2010-533747 A | 10/2010 |
| JP | 2011-132483 A | 7/2011 |
| WO | 2006/041030 A1 | 4/2006 |

\* cited by examiner

*Primary Examiner* — Elizabeth Mulvaney
(74) *Attorney, Agent, or Firm* — Global IP Counselors, LLP

(57) ABSTRACT

An ultraviolet-curable composition for inkjet, which is discharged by an inkjet method, includes a polymerized compound, a metal powder, and a dispersant. The metal powder is treated by a surface preparation with a fluorinated silane compound and/or a fluorinated phosphate ester as a surface preparation agent. The dispersant has a polymeric structure in a basic.

13 Claims, No Drawings

ULTRAVIOLET-CURABLE COMPOSITION FOR INKJET AND RECORDING MATERIAL

CROSS-REFERENCE TO RELATED APPLICATIONS

This application claims priority to Japanese Patent Application No. 2012-020355 filed on Feb. 1, 2012. The entire disclosure of Japanese Patent Application No. 2012-020355 is hereby incorporated herein by reference.

BACKGROUND

1. Technical Field

The present invention relates to an ultraviolet-curable composition for inkjet and a recording material.

2. Background Technology

Conventionally, as a production method of a decorative product presenting glossy appearance, a metallic plating, a stamp-printing by using a metallic foil, a thermal transfer by using a metallic foil, or the like have been used. However, in these methods, problems appeared such that it was difficult to form a fine pattern and also, it was difficult to perform an application to a curved surface part. Also, in the stamp-printing, it had a low on-demand characteristic so that it was not appropriate for the high multi-production. In addition, a problem appeared such that a metal kind of gradation cannot be printed.

On the other hand, as a recording method to a recording medium by using compositions including pigments or colorants, an inkjet method is used. The inkjet method provides excellent formation of the fine pattern and also, it is appropriate to perform the application to the curve surface part. Also, in recent years, a composition (ultraviolet-curable composition for inkjet), which becomes hardened by irradiating ultraviolet light, has been used in order to provide excellent abrasion resistance, excellent water resistance, excellent solvent resistance, or the like in the inkjet method (see, for example, Japanese Laid-Open Patent Publication No. 2009-57548). However, in the ultraviolet-curable composition for inkjet, when the metal powder was used instead of the pigments or colorants, a problem appeared that the glossy appearance, which is originally included as a characteristic of a metal, cannot be sufficiently demonstrated. Also, it caused a problem such as a poor stability (storage stability) of the composition and the deterioration of the discharge stability caused by increasing the viscosity by the gelation.

SUMMARY

The object of the present invention is to provide the ultraviolet-curable composition for inkjet with excellent storage stability and to provide the ultraviolet-curable composition for inkjet which can be appropriately used to form a pattern (printing part) with excellent glossy appearance and excellent abrasion resistance. Also, the object of the present invention is to provide a recording material having a pattern with excellent storage stability, excellent glossy appearance, and excellent abrasion resistance by using the ultraviolet-curable composition for inkjet.

These objects are achieved by the present invention as discussed below. An ultraviolet-curable composition for inkjet in the present invention that is discharged by the inkjet method comprises a polymerized compound, a metal powder, and a dispersant; wherein the metal powder is treated by a surface preparation with a fluorinated silane compound and/or fluorinated phosphate ester as a surface preparation agent, and wherein the dispersant has a polymeric structure in a basic. Because of this, the ultraviolet-curable composition for inkjet can be provided with excellent storage stability and it can be appropriately used for manufacturing a recording material with a pattern (printing part) with excellent glossy appearance and excellent abrasion resistance.

In the ultraviolet-curable composition for inkjet in the present invention, it is preferable that in the metal powder, at least vicinity surface of the powder mainly constitutes Al and the surface is treated by a surface preparation with the fluorinated silane compound and/or the fluorinated phosphate ester. Among the various metal materials, Al originally has excellent glossy appearance, but the present inventors have discovered problems such that when the powder constituting Al was used for the ultraviolet-curable composition for inkjet, the storage stability of the ultraviolet-curable composition for inkjet became low significantly and the deterioration of the discharge stability occurred because the viscosity was increased by the gelation. On the other hand, in the present invention, even when the powder constituting Al on the surface is used, the occurrence of the above problems can be properly prevented. That is, the effect of the present invention is significantly demonstrated when the ultraviolet-curable composition for inkjet includes the metal powder and at least mainly the surface of the powder constituting Al is treated by the fluorinated silane compound and/or the fluorinated phosphate ester. In the ultraviolet-curable composition for inkjet in the present invention, it is preferable that the metal powder has a scale-like shape. Because of this, the recording material produced by using the ultraviolet-curable composition for inkjet can be provided with a particular excellent glossy appearance and a particular excellent abrasion resistance.

In the present invention, the ultraviolet-curable composition for inkjet preferably includes the metal powder that is treated by the surface preparation with the fluorinated silane compound having a chemical formula shown in formula (1) below.

$$R^1SiX^1_aR^2_{(3-a)} \quad (1)$$

(In formula (1), $R^1$ represents a hydrocarbon group in which a part or all of hydrogen atoms is substituted by fluorine atom, $X^1$ represents hydrolysis group, ether group, chloro group or hydroxyl group, $R^2$ represents alkyl group having a carbon number 1 to 4, and a represents an integer between 1 to 3.) Because of this, the recording material produced by using the ultraviolet-curable composition for inkjet can be provided with a particular excellent glossy appearance and a particular excellent abrasion resistance.

In the present invention, the ultraviolet-curable composition for inkjet preferably includes the metal powder that is treated by the surface preparation with the fluorinated phosphate ester having a chemical formula shown in formula (2) below.

$$POR_n(OH)_{3-n} \quad (2)$$

(In formula (2), R represents $CF_3(CF_2)_m-$, $CF_3(CF_2)_m(CH_2)_l-$, $CF_3(CF_2)_m(CH_2O)_l-$, $CF_3(CF_2)_m(CH_2CH_2O)_l-$, $CF_3(CF_2)_mO-$, or $CF_3(CF_2)_m(CH_2)_lO-$, n represents an integer between 1 to 3, m represents an integer between 2 to 18, and l represents an integer between 1 to 18.) Because of this, the ultraviolet-curable composition for inkjet can be provided with excellent storage stability, and the recording material produced by using the ultraviolet-curable composition for inkjet can be provided with a particular excellent glossy appearance and a particular excellent abrasion resistance.

In the ultraviolet-curable composition for inkjet in the present invention, it is preferable that the surface preparation agent has a perfluoroalkyl structure. Because of this, the ultraviolet-curable composition for inkjet is further secured with excellent storage stability, and the recording material produced by using the ultraviolet-curable composition for inkjet can be provided with excellent glossy appearance and excellent abrasion resistance.

In the ultraviolet-curable composition for inkjet in the present invention, it is preferable that the average grain diameter of the metal powder is more than 500 nm and less than 3.0 µm. Because of this, the recording material produced by using the ultraviolet-curable composition for inkjet can be provided with excellent glossy appearance and excellent abrasion resistance. Also, the ultraviolet-curable composition for inkjet can be provided with excellent storage stability and excellent discharge stability.

In the present invention, the ultraviolet-curable composition for inkjet preferably includes phenoxyethyl acrylate as a polymerized compound. Because of this, the ultraviolet-curable composition for inkjet can be provided with excellent storage stability and excellent discharge stability, and the ultraviolet-curable composition for inkjet after discharging by the inkjet method has a particular excellent reactive character so that it can provide a particular excellent productivity of the recording material and a particular excellent abrasion resistance of the formed pattern, or the like.

In the present invention, as a polymerized compound, in addition to phenoxyethyl acrylate as described above, the ultraviolet-curable composition for inkjet preferably includes at least one selected from a group comprising 2-(2-vinyloxy-ethoxy) ethyl acrylate, dipropylene glycol diacrylate, tripropylene glycol diacrylate, 2-hydroxy-3-phenoxypropyle acrylate, and 4-hydroxybutyl acrylate. Because of this, the ultraviolet-curable composition for inkjet can be provided with excellent storage stability and excellent discharge stability, and the ultraviolet-curable composition for inkjet after discharging by the inkjet method has a particular excellent reactive character so that it can provide a particular excellent productivity of the recording material and a particular excellent abrasion resistance of the formed pattern, or the like.

In the present invention, as a polymerized compound, the ultraviolet-curable composition for inkjet preferably includes at least one selected from a group comprising dimethylol tricyclodecane diacrylate, dimethylol dicyclopentane diacrylate, dicyclopentenyl acrylate, dicyclopentanyl acrylate, isobornyl acrylate, acryloylmorpholine, tetrahydrofurfuryl acrylate, cyclohexyl acrylate, isobutyl acrylate, t-butyl acrylate, benzyl acrylate, ethylcarbitol acrylate, and methoxy triethylene glycol acrylate. Because of this, the ultraviolet-curable composition for inkjet can be provided with excellent storage stability and excellent discharge stability, and the formed pattern can be provided with excellent abrasion resistance or the like.

In the present invention, in addition, the ultraviolet-curable composition for inkjet preferably includes a composition A having a partial structure shown in formula (5) below.

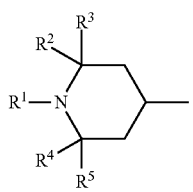
(5)

(In formula (5), $R^1$ represents hydrogen atom, hydrocarbon group, alkoxy group, or oxygen radical, and $R^2$, $R^3$, $R^4$, and $R^5$ respectively and independently represent hydrogen atoms or hydrocarbon group).

Because of this, the ultraviolet-curable composition for inkjet can be provided with a particular excellent storage stability and a particular excellent hardenability. Also, in the recording material produced by using the ultraviolet-curable composition for inkjet, the glossy appearance/high-class appearance, which are originally included as a characteristic of a metal material constituting the metal powder, is effectively demonstrated so that it can provide a particular excellent glossy appearance and a particular excellent abrasion resistance in the printing part and a particular excellent durability in the recording material.

In the ultraviolet-curable composition for inkjet in the present invention, it is preferable to satisfy a relationship of $0.01 \leq X_A/X_M \leq 0.8$ when the content percentage of the composition A is $X_A$ (mass %) and the content percentage of the metal powder is $X_M$ (mass %). Because of this, the ultraviolet-curable composition for inkjet can be provided with excellent storage stability and excellent discharge stability, and the printing part formed by using the ultraviolet-curable composition can be provided with excellent glossy appearance and excellent abrasion resistance.

In the recording material in the present invention, the ultraviolet-curable composition for inkjet imparts on a recording medium, and after that, it is provided by irradiating ultraviolet light. Because of this, the recording material having a pattern (printing part) can be provided with excellent glossy appearance and excellent abrasion resistance.

DETAILED DESCRIPTION OF EXEMPLARY EMBODIMENTS

Hereinafter, the preferred embodiments in the present invention will be explained in detail.

Ultraviolet-Curable Composition for Inkjet

First of all, the detail about the ultraviolet-curable composition for inkjet in the present invention will be explained. The ultraviolet-curable composition for inkjet in the present invention is discharged by an inkjet method and includes the polymerized compound to be polymerized by irradiating ultraviolet light.

By the way, conventionally, as a manufacturing method of a decorative product which presents glossy appearance, a metallic plating, a stamp-printing by using a metallic foil, a thermal transfer by using a metallic foil, or the like have been used. However, in these methods, there were problems such that it was difficult to form a fine pattern and also, it was difficult application to a curved surface part. Also, in the stamp-printing, there was a problem such that a metal kind of gradation cannot be printed.

On the other hand, as a recording method for a recording medium by using compositions including pigments or colorants, an inkjet method is used. The inkjet method can be provided with excellent fine pattern of a formation and it is appropriate to be used for the application to the curved surface part. Also, in recent years, a composition (ultraviolet-curable composition for inkjet), which becomes hardened when irradiating ultraviolet, has been used because it has a particular excellent abrasion resistance, a particular excellent water resistance, a particular excellent solvent resistance, or the like in the inkjet method. However, in the ultraviolet curable composition for inkjet, when the metal powder is used instead of the pigments or colorants, there was a problem that the glossy appearance, which is originally included in a characteristic of a metal, cannot be sufficiently demonstrated. Also, it had a poor stability (storage stability) of the composition and this caused a problem that the deterioration of the discharge stability because the viscosity was increased by the gelation.

Thus, for the objects, the present inventors have seriously researched to solve the above problems, and as a result, the present invention has been achieved. That is, the ultraviolet-curable composition for inkjet in the present invention includes the metal powder with the polymerized compound, and as the metal powder, it includes the powder treated by the surface preparation with a fluorinated silane compound and/or a fluorinated phosphate ester as a surface preparation agent. In addition, it includes the dispersant having a polymeric structure in a basic. Because of this, in the ultraviolet-curable composition for inkjet, it can be provided with excellent chemical stability and excellent dispersal stability. It can be also provided with excellent storage stability and the excellent long term discharge stability. In the recording material produced by using the ultraviolet-curable composition for inkjet, the metal powder can be appropriately arranged on the peripheral outer surface of the printing part so that the glossy appearance, which is originally included in a character of the metal material constituting the metal powder, can be sufficiently demonstrated. Also, even when the polymerized compound which has low surface tension is used as the constituent material of the ultraviolet-curable composition for inkjet, in the recording material produced by the ultraviolet-curable composition for inkjet, the metal powder can be properly arranged (leafing) on the peripheral outer surface of the printing part so that the glossy appearance, which is originally included as a characteristic of the metal material constituting the metal powder, can be sufficiently demonstrated. Accordingly, the selection of the polymerized compounds can be widened and without losing the glossy appearance which is originally included as a characteristic of the metal material, it can be easily adjusted the characteristics of the ultraviolet-curable composition for inkjet and the characteristics of the recording material produced by using the ultraviolet-curable composition for inkjet (for example, viscosity of the ultraviolet-curable composition for inkjet, storage stability, discharge stability, abrasion resistance of the recording material, or the like).

Metal Powder

As described above, in the ultraviolet-curable composition for inkjet in the present invention, as the metal powder, it includes the powder treated by the surface preparation with the fluorinated silane compound and/or the fluorinated phosphate ester as the surface preparation agent.

Mother-Particles

First of all, the detail about metal particles constituting mother-particles (particles processed by the surface preparation using the surface preparation agent) will be explained. It can be appropriate that the mother particles constituting the metal particles constitute at least a metal material in a region including the vicinity of the surface. For example, all of the region could be constituted by the metal material, and also, it can be possible to have a base portion formed by non-metallic material and a coated film formed by the metallic material to coat the base portion.

Also, as a metal material forming mother particles, a metal or various alloys can be used as elemental substances but it is preferable that the mother particles mainly constitute Al in at least vicinity of the surface. Originally, among the various metal materials, Al had a particular excellent glossy appearance, but when the powder constituted by Al applied to the ultraviolet-curable composition for inkjet, the storage stability of the ultraviolet-curable composition became low significantly, and the present inventors have discovered a problem such as the deteriorate of the discharge stability caused by increasing the viscosity because the gelatinization was significantly generated. For this problem, in the present invention, even when the powder constituting Al on the surface is used, the occurrence of the above described problem can be reliably prevented. That is, in the metal powder constituting the ultraviolet-curable composition for inkjet, the powder constituting Al is treated by the surface preparation with the surface preparation agent (fluorinated silane compound and/or fluorinated phosphate ester) so that the effect of the present invention is significantly demonstrated.

Also, the mother particles can be produced by any method, but when it constitutes Al, the vapor deposition method is used to form a film constituted by Al and after that, it is preferably to obtain the powder by crushing the film. By this process, the glossy appearance which is originally included as a characteristic of Al can be effectively appeared to a pattern (printing part) formed by using the ultraviolet-curable composition for inkjet in the present invention. Also, the variability of the characteristics within the particles can be suppressed. Also, by using the method, the relatively-thin metal powder can be produced appropriately. When the mother particles are produced by using this type of method, for example, by performing the formation of film (film formation) constituted by Al on the base material, the mother particles can be produced appropriately. As a base material, for example, a plastic film such as polyethylene terephthalate or the like can be used. Also, the base material can be included a parting agent layer on the surface of the film formation.

Also, it is preferable that the crushing film is performed in a liquid by giving supersonic vibration to the film. By this process, the mother particles having the above described grain diameter can be easily and securely obtained, and the generation of the various sizes, shapes, and characteristics within the particles can be suppressed. Also, in the above described method, when performing the crushing film, as liquid, alcohol compounds such as methanol, ethanol, propanol, butanol, carbon hydride compounds such as n-heptane, n-octane, decane, dodecane, tetra-decane, toluene, xylene, cymene, durene, indene, dipentene, tetrahydronaphthalene, decahydronaphthalene, cyclohexylebenzene, ether compounds such as ethyl glycol dimethyl ether, ethylene glycol diethyl ether, ethylene glycol methylethyl ether, di ethylene glycol dimethyl ether, diethylene glycol diethyl ether, diethylene glycol methylethyl ether, diethylene glycol monobutyl ether acetate, diethylene glycol n-butyl ether, tripropylene glycol dimethyl ether, triethylene glycol ethyl ether, 1,2-dimethoxyethane, bis(2-methoxyethyl)ether, p-dioxane, and polar compounds such as propylene carbonate, γ-butyrolactone, N-methyl-2-pyrolidone, N,N-dimethyl formamide (DMF), N,N-dimethyl acetamide (DMA), dimethyl sulfoxide, cyclohexanone, acetonitrile can be appropriately used. By using this type of the liquid, it is prevented from the unexpected oxidation of the mother particles, and the excellent productivity of the mother particles and the metal powder can be provided and also, the possibility of generating various sizes, shapes, and characteristics within the particles can be small.

Surface Preparation Agent

As described above, the metal powder related to the present invention is treated by the surface preparation with the fluorinated silane compound and/or the fluorinated phosphate ester as the surface preparation agent. First of all, in the surface preparation agent, the detail about the fluorinated silane compound will be explained. As the fluorinated silane compound, a silane compound having at least one fluorine atom within a molecule can be used.

Specifically, it is preferred that the fluorinated silane compound as the surface preparation agent has a chemical formula shown in formula (1) below.

$$R^1SiX^1_aR^2_{(3-a)} \quad (1)$$

(In formula (1), $R^1$ represents a hydrocarbon group in which a part or all of hydrogen atoms is substituted by fluorine atom, $X^1$ represents hydrolysis group, ether group, chloro group or hydroxyl group, $R^2$ represents alkyl group having a carbon number 1 to 4, and a represents an integer between 1 to 3.)

Because of this, the ultraviolet-curable composition for inkjet can be provided with excellent storage stability, and a printing part of the recording material produced by using the ultraviolet-curable composition for inkjet can be provided with excellent glossy appearance and excellent abrasion resistance.

As $R^1$ in formula (1), for example, it can be alkyl group, alkenyl group, aryl group, aralkyl group in which a part or all of hydrogen atoms are substituted by fluorine atom. In addition, at least a part of hydrogen atoms (hydrogen atoms which are not substituted by fluorine atom) included in the molecular configuration can be substituted by amino group, carboxyl group, hydroxyl group, thiol group or the like, and hetero atom or benzene of aromatic ring such as —O—, —S—, —NH—, —N= can intervene within a carbon chain. For example, the concrete examples of $R^1$ are that a part or all of hydrogen atoms are substituted by fluorine atoms in phenyl group, benzyl group, phenethyl group, hydroxyphenyl group, chlorophenyl group, aminophenyl group, naphthyl group, anthranil group, pyrenyl group, thienyl group, pyrrolyl group, cyclohexyl group, cyclohexenyl group, cyclopentyl group, cyclopentenyl group, pyridinyl group, methyl group, ethyl group, n-propyl group, isopropyl group, n-butyl group, isobutyl group, sec-butyl group, tert-butyl group, octadecyl group, n-octyl group, chloromethyl group, methoxyethyl group, hydroxyethyl group, aminoethyl group, cyano group, mercaptopropyl group, vinyl group, allyl group, acryloxyethyl group, methacryloxyethyl group, glycidoxypropyl group, or acetoxy group.

As concrete examples of the fluorinated silane compound shown in formula (1), it is preferable to include a compound having a configuration that a part or all of hydrogen atoms in a silane compound are substituted by fluorine atoms. The silane compounds are dimethyl dimethoxy silane, diethyl diethoxy silane, 1-propenyl methyl dichlorosilane, propyl dimethyl chlorosilane, propylmethyl dichlorosilane, propyl trichlorosilane, propyl triethoxysilane, propyl trimethoxysilane, styrylethyl trimethoxysilane, tetradecyl trichlorosilane, 3-thiocyanate propyl triethoxysilane, p-tolyl dimethylchlorosilane, p-tolyl methyl dichlorosilane, p-tolyl trichlorosilane, p-tolyl trimethoxysilane, p-tolyl triethoxysilane, di-n-propyl di-n-propoxysilane, diisopropyl di-iso-propoxysilane, di-n-butyl di-n-butyloxysilane, di-sec-butyl di-sec-butyloxysilane, di-t-butyl di-t-butyloxysilane, octadecyltrichlorosilane, octadecyl methyl diethoxy silane, octadecyl triethoxysilane, octadecyl trimethoxysilane, octadecyl dimethylchlorosilane, octadecyl methyl dichlorosilane, octadecyl methoxy dichlorosilane, 7-octenyl dimethylchlorosilane, 7-octenyl trichlorosilane, 7-octenyl trimethoxysilane, octyl methyl dichlorosilane, octyl dimethyl chlorosilane, octyl trichlorosilane, 10-undecenyl dimethylchlorosilane, undecyl trichlorosilane, vinyl dimethyl chlorosilane, methyl octadecyl dimethoxysilane, methyl dodecyl diethoxysilane, methyl octadecyl dimethoxysilane, methyl octadecyl diethoxy silane, n-octyl methyl dimethoxy silane, n-octyl methyl diethoxy silane, triancotil dimethylchlorosilane, triancotil trichlorosilane, methyl trimethoxysilane, methyl triethoxysilane, methyltri-n-propoxysilane, methyl iso-propoxysilane, methyl-n-butyloxysilane, methyltri-sec-butyloxysilane, methyltri-t-butyloxysilane, ethyl trimethoxysilane, ethyl triethoxysilane, ethyl tri-n-propoxysilane, ethyl isopropoxysilane, ethyl-n-butyloxysilane, ethyl tri-sec-butyloxysilane, ethyl tri-t-butyloxysilane, n-propyl trimethoxysilane, isobutyl trimethoxysilane, n-hexyl trimethoxy silane, hexadecyl trimethoxysilane, n-octyl trimethoxysilane, n-dodecyl trimethoxy silane, n-octadecyl trimethoxysilane, n-propyl triethoxysilane, isobutyl triethoxysilane, n-hexyl triethoxysilane, hexadecyl triethoxysilane, n-octyl triethoxysilane, n-dodecyl trimethoxysilane, n-octadecyl triethoxysilane, 2-[2-(trichlorosilyl)ethyl]pyridine, 4-[2-(trichlorosilyl)ethyl]pyridine, diphenyl dimethoxysilane, diphenyl diethoxysilane 1,3-(trichlorosilyl methyl) heptacosane, dibenzyl dimethoxysilane, dibenzyl diethoxy silane, phenyl trimethoxysilane, phenyl methyl dimethoxy silane, phenyl dimethyl methoxysilane, phenyl dimethoxysilane, phenyl diethoxysilane, phenyl methyl diethoxysilane, phenyl dimethyl ethoxysilane, benzyl triethoxysilane, benzyl trimethoxysilane, benzyl methyl dimethoxy silane, benzyl dimethyl trimethoxysilane, benzyl dimethoxysilane, benzyl diethoxysilane, benzyl methyl diethoxysilane, benzyl dimethy ethoxylsilane, benzyl triethoxysilane, dibenzyl dimethoxysilane, dibenzyl diethoxysilane, 3-acetoxypropyl trimethoxysilane, 3-acryloxypropyl trimethoxysilane, allyl trimethoxysilane, allyl triethoxysilane, 4-aminobutyl triethoxysilane (amino ethyl amino methyl) phenethyl trimethoxysilane, N-(2-aminoethyl)-3-aminopropylmethyl dimethoxysilane, N-(2-aminoethyl)-3-aminopropyl trimethoxysilane, 6-(aminohexyl aminopropyl)trimethoxysilane, p-aminophenyl trimethoxysilane, p-aminophenyl ethoxysilane, m-aminophenyl trimethoxysilane, m-aminophenyl triethoxysilane, 3-aminopropyl trimethoxysilane, 3-aminopropyl triethoxysilane, ω-aminoundecyl trimethoxysilane, amyl triethoxysilane, benzoxazocinepine dimethyl ester, 5-(bicyclo heptenyl)triethoxysilane, bis(2-hydroxyethyl)-3-aminopropyl triethoxysilane, 8-bromooctyl trimethoxysilane, bromophenyl trimethoxysilane, 3-bromopropyl trimethoxysilane, n-butyl trimethoxysilane, 2-chloromethyl triethoxysilane, chloromethyl methyl diethoxysilane, chloromethyl methyl diisopropoxysilane, p-(chloromethyl) phenyl trimethoxysilane, chloromethyl triethoxysilane, chlorophenyl triethoxysilane, 3-chloropropyl methyl dimethoxysilane, 3-chloropropyl triethoxysilane, 3-chloropropyl trimethoxysilane, 2-(4-chlorosulfonyl phenyl)ethyl trimethoxysilane, 2-cyanoethyl triethoxysilane, 2-cyanoethyl trimethoxysilane, cyanomethyl phenethyl triethoxysilane, 3-cyanopropyl triethoxysilane, 2-(3-cyclohexenyl)ethyl trimethoxysilane, 2-(3-cyclohexenyl)ethyl triethoxysilane, 3-cyclohexenyl trichlorosilane, 2-(3-cyclohexenyl) ethyl trichlorosilane, 2-(3-cyclohexenyl)ethyl dimethyl chlorosilane, 2-(3-cyclohexenyl)ethyl methyl dichlorosilane, cyclohexyl dimethylchlorosilane, cyclohexyl ethyl dimethoxysilane, cyclohexyl methyl dichlorosilane, cyclohexyl methyl dimethoxysilane, (cyclohexyl methyl) trichlorosilane, cyclohexyl trichlorosilane, cyclohexyl trimethoxysilane, cyclooctyl trichlorosilane, (4-cyclooctenyl) trichlorosilane, cyclopentyl trichlorosilane, cyclopentyl trimethoxysilane, 1,1-diethoxy-1-Silacyclopenta-3-ene, 3-(2,4-dinitrophenyl amino)propyl triethoxysilane, (dimethyl chlorosilyl)methyl-7,7-dimethyl amino lupinane, (cyclohexyl aminomethyl) methyl diethoxysilane, (3-cyclopenta dienylpropyl)triethoxysilane, N,N-diethyl-3-aminopropyl trimethoxysilane, 2-(3,4-epoxycyclohexyl)ethyltrimethoxysilane, 2-(3,4-epoxycyclohexyl)ethyl triethoxysilane, (furfuryl oxymethyl)triethoxysilane, 2-hydroxy-4-(3-tri-ethoxy propoxy)diphenyl ketone, 3-(p-methoxyphenyl)propyl methyl dichlorosilane, 3-(p-methoxyphenyl)propyl trichlorosilane, p-(methylphenethyl) methyl dichlorosilane, p-(methylphenethyl)trichlorosilane, p-(methylphenethyl)dimethylchlorosilane, 3-morpholinopropyl trimethoxysilane, (3-glycidoxypropyl)methyldiethoxysilane, 3-glycidoxypropyl trimethoxysilane, 1,2,3,4,7,7-hexachloro-6-methyldiethoxysilyl-2-norbornene, 1,2,3,4,7,7-hexachloro-6-triethoxysilyl-2-norbornene, 3-iodine propyl trimethoxysilane, 3-isocyanate propyl triethoxysilane, (mercaptomethyl) methyldiethoxysilane, 3-mercaptopropyl methyldimethoxy silane, 3-mercaptopropyl dimethoxysilane, 3-mercaptopropyl triethoxysilane, 3-methacryloxypropyl methyldiethoxysilane, 3-methacryloxypropyl trimethoxysilane, methyl-{2-(3-trimethoxysilyl propylamino) ethylamino}-3-propionate, 7-octenyl trimethoxysilane, R—N-α-phenethyl-N-triethoxysilyl propyl urea, S—N-α-phenethyl-N'-triethoxysilylpropyl urea, phenethyl trimethoxysilane, phenethyl methyl dimethoxysilane, phenethyl dimethylsilane, phenethyl dimethoxysilane, phenethyl diethoxysilane, phenethyl methyl diethoxy silane, phenethyl dimethylethoxysilane, phenethyl triethoxysilane, (3-phenylpropyl)dimethylchlorosilane, (3-phenylpropyl) methyldichlorosilane, N-phenyl aminopropyl trimethoxysilane, N-(triethoxysilylpropyl) dansylamide, N-(3-triethoxysilylpropyl)-4,5-dihydroimidazole, 2-(triethoxysilylethyl)-5-(chloroacetoxy) bicycloheptane, (S)—N-triethoxysilylpropyl-O-menthocarbamate, 3-(triethoxysilylpropyl)-p-nitro-benzamide, 3-(triethoxysilyl) propyl succinate anhydride, N-[5-(trimethoxysilyl)-2-aza-1-oxo-pentyl]caprolactam, 2-(trimethoxysilylethyl) pyridine, N-(trimethoxysilylethyl)benzyl-N,N,N-trimethyl ammonium chloride, phenyl vinyl diethoxysilane, 3-thiocyanate propyltriethoxysilane, N-{3 acid(triethoxysilyl) propyl}phthalamide, 1-trimethoxysilyl-2-(chloromethyl) phenyl ethane, 2-(trimethoxysilyl)ethyl phenyl sulfonyl azide, β-trimethoxy silylethyl-2-pyridine, trimethoxysilylpropyl diethylene triamine, N-(3-trimethoxysilylpropyl) pyrrole, N-trimethoxysilylpropyl-N,N,N-tri-butyl ammonium bromide, N-trimethoxysilylpropyl-N, N,N-tributyl ammonium chloride, N-trimethoxysilylpropyl-N,N,N-trimethylammonium chloride, vinyl methyl diethoxysilane, vinyl triethoxysilane, vinyl trimethoxysilane, vinyl methyl dimethoxysilane, vinyl dimethyl methoxysilane, vinyl dimethyl ethoxysilane, vinyl methyl dichlorosilane, vinyl phenyl dichlorosilane, vinyl phenyl diethoxysilane, vinyl phenyl dimethylsilane, vinyl phenyl methyl chlorosilane, vinyl triphenoxysilane, vinyl tris-t-butoxysilane, adamantyl ethyl trichlorosilane, allyl phenyl trichlorosilane, (aminoethyl aminomethyl) phenethyl trimethoxysilane, 3-aminophenoxy dimethyl vinyl silane, phenyl trichlorosilane, phenyl dimethylchlorosilane, phenyl methyl dichlorosilane, benzyl trichloro silane, benzyl dimethyl chlorosilane, benzyl methyl dichlorosilane, phenethyl dimethylchlorosilane, phenethyl trichlorosilane, phenethyl dimethylchlorosilane, phenethyl methyldichlorosilane, 5-(bicyclo heptenyl)trichlorosilane 5-(bicyclo heptenyl)triethoxy silane, 2-(bicyclo heptyl) dimethylchlorosilane, 2-(bicyclo heptyl)trichlorosilane, 1,4-bis(trimethoxysilylethyl)benzene, bromophenyl trichlorosilane, 3-phenoxypropyl dimethylchlorosilane, 3-phenoxypropyl trichlorosilane, t-butyl phenyl chlorosilane, t-butyl phenyl methoxysilane, t-butyl phenyl dichlorosilane, p-(t-butyl)phenethyl dimethylchlorosilane, p-(t-butyl)phenethyl trichlorosilane, 1,3-(dichloromethyl silylmethyl)heptacosane, ((chloromethyl)phenylethyl)dimethylchlorosilane, ((chloromethyl) phenylethyl) methyl dichlorosilane, ((chloromethyl) phenylethyl)trichlorosilane, ((chloromethyl) phenylethyl)trimethoxysilane, chlorophenyl trichlorosilane, 2-cyanoethyl trichlorosilane, 2-cyanoethyl methyl dichlorosilane, 3-cyanopropyl methyldiethoxysilane, 3-cyanopropyl methyl dichlorosilane, 3-cyanopropyl methyl dichlorosilane, 3-cyanopropyl dimethylethoxysilane, 3-cyanopropyl methyl dichlorosilane, 3-cyanopropyl trichlorosilane, or the like.

It is preferable that the fluorinated silane compound (surface preparation agent) has a perfluoroalkyl structure ($C_nF_{2n+1}$). Because of this, a printing part of the recording material produced by using the ultraviolet-curable composition for inkjet can be provided with excellent glossy appearance and excellent abrasion resistance.

As a fluorinated silane compound having a perfluoroalkyl structure ($C_nF_{2n+1}$), for example, it can be shown in formula (3) below.

$$C_nF_{2n+1}(CH_2)_mSiX^1_aR^2_{(3-a)} \qquad (3)$$

(In formula (3), $X^1$ represents hydrolysis group, ether group, chloro group or hydroxyl group, $R^2$ represents alkyl group having a carbon number 1 to 4, n represents an integer between 1 to 14, m represents an integer between 2 to 6, and a represents an integer between 1 to 3.)

The concrete examples of the compounds having such a structure are $CF_3$—$CH_2CH_2$—$Si(OCH_3)_3$, $CF_3(CF_2)_3$—$CH_2CH_2$—$Si(OCH_3)_3$, $CF_3(CF_2)_5$—$CH_2CH_2$—$Si(OCH_3)_3$, $CF_3(CF_2)_5$—$CH_2CH_2$—$Si(OC_2H_5)_3$, $CF_3(CF_2)_7$—$CH_2CH_2$—$Si(OCH_3)_3$, $CF_3(CF_2)_{11}$—$CH_2CH_2$—$Si(OC_2H_5)_3$, $CF_3(CF_2)_3$—$CH_2CH_2$—$Si(CH_3)(OCH_3)_2$, $CF_3(CF_2)_7$—$CH_2CH_2$—$Si(CH_3)(OCH_3)_2$, $CF_3(CF_2)_8$—$CH_2CH_2$—$Si(CH_3)(OC_2H_5)_2$, $CF_3(CF_2)_8$—$CH_2CH_2$—$Si(C_2H_5)(OC_2H_5)_2$, or the like.

Also, as a fluorinated silane compound, it is also possible to use a perfluoroether structure ($C_nF_{2n+1}O$) instead of perfluoroalkyl structure ($C_nF_{2n+1}$). As a fluorinated silane compound having a perfluoroether structure ($C_nF_{2n+1}O$), for example, it can be shown in formula (4) below.

$$C_pF_{2p+1}O(C_pF_{2p}O)_r(CH_2)_mSiX^1_aR^2_{(3-a)} \qquad (4)$$

(In formula (4), $X^1$ represents hydrolysis group, ether group, chloro group or hydroxyl group, $R^2$ represents alkyl group having a carbon number 1 to 4, p represents an integer between 1 to 4, r represents an integer less than 10, m represents an integer between 2 to 6, and a represents an integer between 1 to 3.)

The concrete examples of the compounds having such a structure are $CF_3O(CF_2O)_6$—$CH_2CH_2$—$Si(OC_2H_5)_3$, $CF_3O(C_3F_6O)_4$—$CH_2CH_2$—$Si(OCH_3)_3$, $CF_3O(C3F6O)_2(CF_2O)_3$—$CH_2CH_2$—$Si(OCH_3)_3$, $CF_3O(C3F6O)_8$—$CH_2CH_2$—$Si(OCH_3)_3$, $CF_3O(C4F9O)_5$—$CH_2CH_2$—$Si(OCH_3)_3$, $CF_3O(C4F9O)_5$—$CH_2CH_2$—$Si(CH_3)(OC_2H_5)_2$, $CF_3O(C3F6O)_4$—$CH_2CH_2$—$Si(C_2H_5)(OCH_3)_2$.

Next, among the surface preparation agents, the detail about the fluorinated phosphate ester will be explained. As the fluorinated phosphate ester, a phosphate ester having at least one fluorine atom within a molecule can be used. Specifically, it is preferable that the fluorinated phosphate ester as the surface preparation agent has a chemical formula shown in formula (2) below.

$$POR_n(OH)_{3-n} \quad (2)$$

(In formula (2), R represents $CF_3(CF_2)_m-$, $CF_3(CF_2)_m(CH_2)_l-$, $CF_3(CF_2)_m(CH_2O)_l-$, $CF_3(CF_2)_m(CH_2CH_2O)_l-$, $CF_3(CF_2)_mO-$ or $CF_3(CF_2)_m(CH_2)_lO-$, n represents an integer between 1 to 3, m represents an integer between 2 to 18, and l represents an integer between 1 to 18.)

Because of this, the ultraviolet-curable composition for inkjet can be provided with a particular excellent storage stability, and a printing part of the recording material produced by using the ultraviolet-curable composition for inkjet can be provided with a particular excellent glossy appearance and a particular excellent abrasion resistance. In formula (2), it is preferable that m is an integer between 3 to 14 but an integer between 4 to 12 is more preferable. Thus, the above described effect can be more sufficiently demonstrated. In addition, in formula (2), it is preferable that l is an integer between 1 to 14 but an integer between 1 to 10 is more preferable. Because of this, the above described effect can be more sufficiently demonstrated.

Also, it is preferable that the fluorinated phosphate ester (surface preparation agent) has ($C_nF_{2n+1}$). Because of this, the ultraviolet-curable composition for inkjet can be provided with excellent storage stability, and a printing part of the recording material produced by using the ultraviolet-curable composition for inkjet can be provided with excellent glossy appearance and excellent abrasion resistance.

The above surface preparation agent (fluorinated silane compound, fluorinated phosphate ester) can directly treat the mother particles but it is preferable that after treating acid or base, the mother particles are treated by the surface preparation agent (fluorinated silane compound, fluorinated phosphate ester). Because of this, a modification provided by a chemical bonding to the surface of the mother particles treated by the surface preparation agent (fluorinated silane compound, fluorinated phosphate ester) can be securely performed so that the above described effect of the present invention can be more effectively demonstrated. As an acid, for example, it can be proton acid of hydrochloric acid, sulfuric acid, phosphoric acid, nitric acid, acetic acid, carbonic acid, formic acid, benzoic acid, chlorous acid, hypochlorous acid, sulfurous acid, hyposulfurous acide, nitrous acid, hyponitrous acid, phosphorous acid, and hypophosphorous acid, or the like. Among them, hydrochloric acid, phosphoric acid, and acetic acid can be preferable. On the other hand, as a base, for example, sodium hydrate, potassium hydrate, calcium hydrate, or the like can be used. Among them, sodium hydrate and potassium hydrate can be preferable.

The shape of the metal powder can be spherical shape, spindle shape, needle-shape, or the like, but scale like-shape can be preferable. Because of this, on the recording medium that the ultraviolet-curable composition for inkjet is applied, a main surface of metal powder can be arranged along a surface shape of the recording medium so that the metal material constituting the metal powder, which is originally provided with glossy appearance or the like, can be more effectively demonstrated in an obtained recording medium. Also, the formed pattern (printing part) can be provided with excellent glossy appearance and excellent high-class appearance, and the recording material can be provided with excellent abrasion resistance. In addition, in a case that the surface preparation is not provided by the fluorinated silane compound and/or the fluorinated phosphate ester and the metal powder has scale-like shape, it significantly tends to become lower storage stability and discharge stability of the ultraviolet-curable composition for inkjet. However, in the present invention, even when the metal powder has scale-like shape, it can be absolutely prevented from the occurrence of this type of problem. That is, when the shape of the metal powder is scale-like, the effect of the present invention is significantly demonstrated.

In the present invention, the scale-like shape is defined that an area as viewed from a predetermined angle (as viewed in a planar view) is bigger shape than an area as viewed in a direction perpendicular to an observation direction such as a plated-form or a curved plated-form. Specifically, a ratio between an area $S_1$ ($\mu m^2$) as viewed in a direction observed from where a profile area becomes maximum and an area $S_0$ ($\mu m^2$) as viewed in a direction observed from where an area as viewed in a direction perpendicular to an observation direction becomes maximum is preferably more than 2, and more preferably more than 5, and further preferably more than 8. For example, this value can be obtained by performing the observation for any 10 particles and averaging the calculated values for these particles.

The average grain diameter of the metal powder is preferably more than 500 nm and less than 3.0 μm and more preferably more than 800 nm and less than 1.8 μm. Because of this, the recording material produced by using the ultraviolet-curable composition for inkjet can be provided with excellent glossy appearance and excellent high-class appearance. Also, the ultraviolet-curable composition for inkjet can be provided with excellent storage stability and excellent discharge stability. The content rate of the metal powder in the ultraviolet-curable composition for inkjet is preferably more than 0.5 mass % and less than 10.0 mass %, and more preferably, more than 1.0 mass % and less than 5.0 mass %.

Dispersant

In the ultraviolet-curable composition for inkjet in the present invention, in addition to the metal powder as described above, it includes a dispersant having a polymeric structure in a basic (basic high molecular dispersant). Because of this, the ultraviolet-curable composition for inkjet can be provided with excellent storage stability, and the recording material (having a printing part) produced by using the ultraviolet-curable composition for inkjet can be provided with excellent glossy appearance and excellent abrasion resistance. These types of excellent effects are provided because it includes the above described metal powder (treated by the surface preparation agent using the fluorinated silane compound and/or the fluorinated phosphate ester) and the basic high molecular dispersant so that if it includes only one of the metal power or the basic high molecular dispersant, the above described excellent effect cannot be provided. By the way, in the present invention, the basic high molecular dispersant can be anything having a polymeric structure which includes a basic and it is not limited to the particular molecular weight.

The polymeric structure constituting the basic high molecular dispersant is not limited but, for example, acrylic polymeric structure (including copolymer), methacrylic polymeric structure (including copolymer), polymeric structure of polyurethane series, hydroxyl group-containing carboxylic acid ester structure, polymeric structure of polyether series, polymeric structure of silicone series, or the like can be used. The amine number of the basic high molecular dispersant is not particularly limited, but more than 3 mg KOH/g and less than 80 mg KOH/g is preferable, and more than 10 mg KOH/g and less than 70 mg KOH/g is more preferable.

As a concrete example of the basic high molecular dispersant that can be used in the present invention, DISPERBYK-116 (made by BYK Chemie Company), DISPERBYK-182 (mad by BYK Chemie Company), DISPERBYK-183 (made by BYK Chemie Company), DISPERBYK-184 (made by BYK Chemie Company), DISPERBYK-2155 (made by BYK Chemie Company), DISPERBYK-2164 (made by BYK Chemie Company), DISPERBYK-108 (made by BYK Chemie Company), DISPERBYK-112 (made by BYK Chemie Company), DISPERBYK-198 (made by BYK Chemie Company), DISPERBYK-2150 (made by BYK Chemie Company), PAA-1112 (made by Nittobo Co., Ltd.) can be used.

A content rate of the basic high molecular dispersant in the ultraviolet-curable composition for inkjet is preferably more than 0.01 mass % and less than 5.0 mass %, and more preferably, more than 0.1 mass % and less than 2.0 mass %. Because of this, the ultraviolet-curable composition for inkjet can be provided with excellent storage stability, excellent discharge stability, excellent hardenability, and the recording material produced by using the ultraviolet-curable composition for ink can be provided with excellent glossy appearance and excellent abrasion resistance. By the way, the ultraviolet-curable composition for inkjet can include more than 2 types of compositions as a basic high molecular dispersant. In this case, the sum of the content rate of these compounds is preferably in a range of the above values.

Polymerized Compound

A polymerized compound has properties such that it can be polymerized by irradiating ultraviolet and can be hardened. By including these types of properties, the recording material produced by using the ultraviolet-curable composition for inkjet can be provided with excellent abrasion resistance, excellent water resistance, excellent solvent resistance, or the like. The polymerized compound is liquid form so that in the ultraviolet-curable composition for inkjet, it is preferable to be functional as a dispersant to disperse the metal powder. Because of this, it is not necessary to separately use a dispersant which is removed (vaporized) in the production process of the recording material. Since the dispersant removal process is unnecessary in the production of the recording material, the excellent productivity of the recording material can be provided. Also, since it is not necessary to use the organic solvent that is used in general as a dispersant, an occurrence of the VOC (volatile organic compound) problem can be prevented. Also, by containing the polymerized compound, a printing part formed by using the ultraviolet-curable composition for inkjet can be provided with excellent adhesiveness for various types of recording medium (base material). That is, by containing the polymerized compound, the ultraviolet-curable composition for inkjet becomes excellent media responsiveness.

As a polymerized compound, if it has a component that can be polymerized by irradiating ultraviolet, for example, various types of monomer, various types of oligomer (including dimer, trimer, or the like), or the like can be used. However, the ultraviolet-curable composition for inkjet preferably contains at least a monomer component as a polymerized compound. Monomer generally has a low viscosity compare to oligomer component, or the like so that the ultraviolet-curable composition for inkjet has an advantage of excellent discharge stability.

The monomers as a polymerized compound are, for example, isobornyl acrylate, 4-hydroxybutyl acrylate, lauryl acrylate, 2-methoxyethyl acrylate, phenoxyethyl acrylate, isooctyl acrylate, stearyl acrylate, cyclohexyl acrylate, 2-ethoxyethyl acrylate, benzyl acrylate, 1H,1H,5H-octafluoropentyl acrylate, 1H,1H,5H-octafluoropentyl methacrylate, 2-hydroxyethyl acrylate, 2-hydroxypropyl acrylate, isobutyl acrylate, t-butyl acrylate, tetrahydrofurfuryl acrylate, ethyl carbitol acrylate, 2,2,2-trifluoroethyl acrylate, 2,2,2-trifluoroethyl methacrylate, 2,2,3,3-tetrafluoro-propyl acrylate, methoxy triethylene glycol acrylate, methoxy triethylene glycol acrylate, PO-modified nonylphenol acrylate, EO-modified nonylphenol acrylate, EO-modified 2-ethylhexyl acrylate, EO-modified nonylphenol acrylate, phenyl glycidyl ether acrylate, phenoxydiethylene glycol acrylate, EO-modified phenol acrylate, phenoxy ethyl acrylate, EO-modified phenol acrylate, EO-modified cresol acrylate, methoxy polyethylene glycol acrylate, dipropylene glycol acrylate, dicyclopentenyl acrylate, dicyclopentenyloxyethyl acrylate, 2-n-butyl-2-ethyl-1,3-propanediol diacrylate, tripropylene glycol diacrylate, tetra ethylene glycol diacrylate, 1,9-nonane diol diacrylate, 1,4-butanediol diacrylate, bisphenol A EO-modified diacrylate, 1,6-hexanediol diacrylate, polyethylene glycol 200 diacrylate, polyethylene glycol 300 diacrylate, neopentyl glycol hydroxypivalate diacrylate, 2-ethyl-2-butyl-propanediol diacrylate, polyethylene glycol 400 diacrylate, polyethylene glycol 600 diacrylate, polypropylene glycol diacrylate, 1,9-nonanediol diacrylate, 1,6-hexanediol diacrylate, bisphenol A EO-modified diacrylate, PO-modified bisphenol A diacrylate, EO-modified hydrogenated bisphenol A dipropylene, dipropylene glycol diacrylate, polypropylene glycol diacrylate, trimethylolpropane triacrylate, pentaerythritol triacrylate, trimethylolpropane EO-modified triacrylate, glycerin PO-added triacrylate, trisacryloyloxyethyl phosphate, pentaerythritol tetraacrylate, PO-modified trimethylolpropane triacrylate, PO-modified trimethylolpropane triacrylate, tris(acryloxyethyl)isocyanurate, pentaerythritol triacrylate, trimethylolpropane triacrylate, pentaerythritol triacrylate, acrylic acid 2-(2-vinyloxyethoxy) ethyl, 1-adamantyl methyl acrylate, 1-adamantyl acrylate, 2-acryloyloxyethyl phthalate, isobornyl acrylate, 3-acryloyloxyethyl propyl acrylate, acryloyl morpholine, lipoxy SP series, dicyclopentanyl acrylate, 2-hydroxy 3-phenoxypropyl acrylate, w-carboxy acryloyloxyethyl phthalate, dimethylol dicyclopentane diacrylate, diacrylate isosialate/triacrylate mixture, neopentyl glycol diacrylate, ditrimethylolpropane tetraacrylate, dipentaerythritol penta/hexa-acrylate, dipentaerythritol hexa acrylate, trimethylolpropane PO-modified triacrylate, diethylene glycol diethyl ether, or the like. Among them, 4-hydroxybutyl acrylate, phenoxy ethyl acrylate, phenoxy ethyl acrylate, dicyclopentenyl acrylate, dicyclopentenyloxyethyl acrylate, triethylene glycol diacrylate, tetraethylene glycol diacrylate, dipropylene glycol diacrylate, trimethylpropane triacrylate, trimethylolpropane EO-modified triacrylate, pentaerythritol tetraacrylate, pentaerythritol triacrylate, and acrylic acid 2-(2-vinyloxyethoxy) ethyl are preferable.

Specifically, the ultraviolet-curable composition for inkjet preferably includes phenoxyethyl acrylate as a polymerized compound. Because of this, the ultraviolet-curable composition for inkjet can be provided with excellent storage stability and excellent discharge stability, and the ultraviolet-curable composition for inkjet after discharging by the inkjet method has a particular excellent reactive character so that it can provide a particular excellent productivity of the recording material, a particular excellent abrasion resistance of the formed pattern, or the like.

Also, as a polymerized compound, in addition to phenoxyethyl acrylate, the ultraviolet-curable composition preferably includes at least one selected from a group comprising acrylic acid 2-(2-vinyloxyethoxy) ethyl, dipropylen glycol diacrylate, tripropylen glycol acrylate, 2-hydroxy 3-phenoxypropyl acrylate, and 4-hydroxybutyl acrylate. Because of this, the ultraviolet-curable composition for inkjet can be provided with excellent storage stability and excellent discharge stability, and the ultraviolet-curable composition for inkjet after discharging by the inkjet method has a particular excellent reactive character so that it can provide a particular excellent productivity of the recording material, a particular excellent abrasion resistance of the formed pattern, or the like.

Also, as a polymerized compound, the ultraviolet-curable composition for inkjet preferably includes dimethylol tricyclodecane diacrylate, dimethylol dicyclopentane diacrylate, dicyclopentenyl acrylate, dicyclopentanyl acrylate, isobornyl acrylate, acryloylmorpholine, tetrahydrofurfuryl acrylate, cyclohexyl acrylate, isobutyl acrylate, t-butyl acrylate, benzyl acrylate, ethylcarbitol acrylate, and methoxy triethylene glycol acrylate. Because of this, the ultraviolet-curable composition for inkjet can be provided with excellent storage stability and excellent discharge stability, and the formed pattern can be provided with excellent abrasion resistance, or the like.

Also, as a polymerized compound, the ultraviolet-curable composition for inkjet can include oligomer besides monomer. Specifically, it is preferable to include multifunctional oligomer. Because of this, the ultraviolet-curable composition for inkjet can be provided with excellent storage stability, and the formed pattern can be provided with a particular excellent abrasion resistance, or the like. By the way, in the present invention, the inside of the polymerized compound also has a repeated structure in a scaffold molecule, and if the molecular weight is more than 600, it calls oligomer. If the repeated structure is urethane, it is urethane oligomer. If the repeated structure is epoxy, it is epoxy oligomer. They are preferably used as an oligomer.

A content rate of the polymerized compound in the ultraviolet-curable composition for inkjet is preferably more than 70 mass % and less than 99 mass %, and more preferably, more than 80 mass % and less than 98 mass %. Because of this, the ultraviolet-curable composition for inkjet can be provided with excellent storage stability, excellent discharge stability, excellent hardenability, and the recording material produced by using the ultraviolet-curable composition for ink can be provided with excellent glossy appearance and excellent abrasion resistance. By the way, the ultraviolet-curable composition for inkjet can include more than 2 types of compositions as a polymerized compound. In this case, the sum of the content rates of these compounds is preferably in a range of the above values.

Composition A

Also, in the ultraviolet-curable composition for inkjet in the present invention, it is preferable to include a composition A having a partial structure shown in formula (5) below.

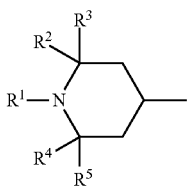

(5)

(In formula (5), $R^1$ represents hydrogen atom, hydrocarbon group, or alkoxy group, and $R^2$, $R^3$, $R^4$, and $R^5$ respectively and independently represent hydrogen atoms or hydrocarbon group).

By containing the composition A having such a chemical formula mixed with the metal powder treated by the above described surface preparation and the basic high molecular dispersant in the ultraviolet-curable composition for inkjet, the ultraviolet-curable composition for inkjet can be provided with a particular excellent storage stability and a particular excellent hardenability. Also, in the recording material produced by using the ultraviolet-curable composition for inkjet, the glossy appearance/high-class appearance, which is originally included as a characteristic of a metal material constituting the metal powder, is effectively demonstrated so that it can provide a particular excellent glossy appearance and a particular excellent abrasion resistance of the printing part and it can provide a particular excellent durability of the recording material.

In formula (5), $R^1$ represents hydrogen atom, hydrocarbon group, or alkoxy group (this is a chain or alicyclic hydrocarbon group bonded to oxygen atom), but specifically, hydrogen atom, methyl group, or octyloxy group are preferable. Because of this, the ultraviolet-curable composition for inkjet can be provided with excellent storage stability and excellent discharge stability, and the printing part formed by using the ultraviolet-curable composition for inkjet can be provided with excellent glossy appearance and excellent abrasion resistance.

Also, in formula (5), $R^2$ to $R^5$ could respectively and independently represent hydrogen atom or hydrocarbon group, but alkyl group of a carbon number 1 to 3 is preferable and methyl group is more preferable. Because of this, the ultraviolet-curable composition for inkjet can be provided with excellent storage stability and excellent discharge stability, and a printing part formed by using the ultraviolet-curable composition for inkjet can be provided with excellent glossy appearance and excellent abrasion resistance.

A content rate of the composition A in the ultraviolet-curable composition for inkjet is preferably more than 0.1 mass % and less than 5.0 mass %, and more preferably, more than 0.5 mass % and less than 3.0 mass %. Because of this, the ultraviolet-curable composition for inkjet can be provided with excellent storage stability, excellent discharge stability, and excellent hardenability, and the recording material produced by using the ultraviolet-curable composition for inkjet can be provided with excellent glossy appearance and excellent abrasion resistance. By the way, the ultraviolet-curable composition for inkjet can include more than 2 types of compositions as a composition A. In this case, the sum of the content rate of these compounds is preferably in a range of the above values. When the content rate of the composition A is $X_A$ (mass %) and the content rate of the metal powder is $X_M$ (mass %), it is preferable to satisfy a relationship of $0.01 \leq X_A/X_M \leq 0.8$, and a relationship of $0.05 \leq X_A/X_M \leq 0.4$ is more preferable. By satisfying these relationships, the ultraviolet-curable composition for inkjet can be provided with excellent storage stability and excellent discharge stability, and a printing part formed by using the ultraviolet-curable composition for inkjet can be provided with excellent glossy appearance and excellent abrasion resistance.

Other Components

The ultraviolet-curable composition for inkjet in the present invention can include components (other components) besides the components discussed above. As these components, for example, it can be a photopolymerization initiator, slip agents (leveling agent), dispersants other than the basic high molecular dispersant, a polymerization accelerator, a polymerization inhibitor, penetration enhancers, wetting agents (humectants), coloring agents, fixing agents, antifungal agents, preservatives, antioxidants, chelating agents, thickeners, sensitizer (sensitizing dye), or the like.

As a photopolymerization initiator, it is not particularly limited if it can generate active species of radical, cation, or the like by irradiating ultraviolet light and it can start the polymerization reaction of the polymerized compound. As a photopolymerization initiator, a photo-radical polymerization initiator or a photo-cation polymerization initiator can be used, but the photo-radical polymerization initiator is preferably used. When the photopolymerization initiator is used, it is preferable that the photopolymerization initiator has an absorption peak in the ultraviolet range.

As a photo-radical polymerization initiator, for example, it can be aromatic ketones, acyl phosphine oxide compound, aromatic onium salt compound, organic peroxides, thio compound (thioxanthone compound, and thiophenyl group-containing compound), hexaarylbiimidazole compound, ketoxime ester compound, borate compound, azinium compound, metallocene compound, active ester compound, compound having carbon-halogen bond, alkylamine compound, or the like. Among them, in view of resolvability and hardenability to the polymerized compound, at least one selected from acyl phosphine oxide compound and thioxanthone compound is preferable and it is more preferable to combine acyl phosphine oxide compound and thioxanthone compound.

The concrete examples of the photo-radical polymerization initiator are acetophenone, acetophenone benzyl ketal, 1-hydroxy cyclohexyl phenyl ketone, 2,2-dimethoxy-2-phenylacetophenone, xanthone, fluorenone, benzaldehyde, fluorene, anthraquinone, triphenylamine, carbazole, 3-methylaceto phenone, 4-chlorobenzophenone, 4,4'-dimethoxybenzophenone, 4,4'-diamino benzophenone, Michler's ketone, benzoin propyl ether, benzoin ethyl ether, benzyl dimethyl ketal, 1-(4-isopropyl-phenyl)-2-hydroxy-2-methyl-propane-1-one, 2-hydroxy-2-methyl-1-phenylpropan-1-one, thioxanthone, diethyl thioxanthone, 2-isopropylthioxanthone, 2-chlorothioxanthone, 2-methyl-1-[4-(methylthio) phenyl]-2-morpholino-propan-1-one, bis(2,4,6-trimethyl benzoyl)-phenyl phosphine oxide, 2,4,6-trimethylbenzoyl-diphenyl-phosphine oxide, 2,4-diethyloxan, (2,6-dimethyl-benzoyl)-2,4,4-trimethylpentyl phosphine oxide, or the like. Among them, one or more than two compounds are selected and the combination of these compounds can be used. The content rate of the photopolymerization initiator in the ultraviolet-curable composition for inkjet is preferably more than 0.5 mass % and less than 10 mass %. In the range of the content rate of the photopolymerization initiator, ultraviolet curing speed is sufficiently large and in addition, the remains of melted photopolymerization initiator or the coloration caused by the photopolymerization initiator do not occur.

When the ultraviolet-curable composition for inkjet includes a slip agent, by leveling function, the surface of the recording material becomes smoother surface so that the abrasion resistance is improved. As a slip agent, it is not particularly limited, but for example, silicone surfactants of polyester modified-silicone, polyether modified-silicone, or the like can be used and it is preferable to use polyester modified-polydimethylsiloxane or polyether modified-polydimethylsiloxane.

By the way, the ultraviolet-curable composition for inkjet in the present invention can include a polymerization inhibitor. However, even when the polymerization inhibitor is included, the content rate of the polymerization inhibitor in the ultraviolet-curable composition for inkjet is preferably less than 0.6 mass % and more preferably less than 0.2 mass %. Because of this, since the content of the polymerized compound in the ultraviolet-curable composition for inkjet is relatively high, a printing part formed by using the ultraviolet-curable composition for inkjet can be provided with a particular excellent abrasion resistance. Also, in the present invention, even when the content of the polymerization inhibitor is comparatively low as discussed, excellent storage stability and excellent discharge stability of the ultraviolet-curable composition for ink can be sufficiently secured.

Also, it is preferable that the ultraviolet-curable composition for inkjet in the present invention does not include organic solvent that is removed (vaporized) in the production process of the recording material. Because of this, an occurrence of the VOC (volatile organic compound) problem can be effectively prevented. The viscosity of the ultraviolet-curable composition for inkjet in the present invention at room temperature (20° C.) is preferably less than 20 mPa·s and more preferably more than 3 mPa·s and less than 15 mPa·s. Because of this, the ink droplet by the inkjet method can be properly performed.

Recording Material

Next, the detail about the recording material of the present invention will be explained. The recording material of the present invention is produced by applying the above described ultraviolet-curable composition for inkjet onto the recording medium and after that, it is irradiated by the ultraviolet light. Such a recording material has a pattern (printing part) with excellent glossy appearance and excellent abrasion resistance.

As discussed above, the ultraviolet-curable composition for inkjet includes a polymerized compound and it has excellent adhesiveness to the recording medium. Since the ultraviolet-curable composition for inkjet in the present invention has excellent adhesiveness to the recording medium, the recording medium can be anything. Thus, absorbability or non-absorbability can be used and for example, a natural fiber/a synthetic fiber, bonded-fiber fabric of a paper (regular paper, paper for inkjet, or the like), a plastic material, a metal, a ceramic, a wood material, shells, cotton, polyester, wool, or the like can be used.

The recording material of the present invention can be used for any purpose, and for example, it can be used for a decoration product or other purpose. As concrete examples of the present invention, it can be interior decorations for vehicles such as a console lid, a switch-base, a center cluster, an interior panel, an emblem, a center console, an indicator face plate, or the like. Also, it can be indicators such as a control part (type of key switch) of various electric devices, a decorative part demonstrating decorative characteristics, a guidepost, a logo, or the like.

As a droplet discharge method (inkjet method), a piezo method, a method that discharges ink from bubble generated by heating ink, or the like can be used, but from the viewpoint of the prevention of a property change in the ultraviolet-curable composition for inkjet, the piezo method is preferable. A publicly known droplet discharge device can be used for performing the discharge of the ultraviolet-curable composition for inkjet by using the inkjet method.

The ultraviolet-curable composition for inkjet discharged by the inkjet method can be hardened by irradiating the ultraviolet light. As a source of the ultraviolet light, for example, a mercury lamp, a metal halide lamp, an ultraviolet light emitting diode (UV-LED), an ultraviolet laser diode (UV-LD), or the like can be used. Among them, from the viewpoint of compact size, long life, high efficiency, and low cost, the ultraviolet light emitting diode (UV-LED) and the ultraviolet laser diode (UV-LD) are preferable. Hereinbefore, the present invention was explained based on the preferred embodiments, but the present invention is not limited to these embodiments.

EXAMPLES

Next, the concrete examples of the present invention will be explained.

(1) Production of Inkjet Composition

Ultraviolet-Curable Composition for Inkjet

Example 1

First of all, a film made by polyethylene terephthalate, which has a smooth surface, (surface roughness Ra is less than 0.02 min) was prepared.

Next, silicone oil entirely applies to one side of the film surface. Next, a film constituted by Al is formed on the surface, that the silicone oil was applied, by the evaporation method. Further, the film made by polyethylene terephthalate (base material), which was constituted by the Al film, is soaked into the liquid constituted by diethylene glycol diethylester and the supersonic vibration is applied to it. Because of this, the powder made by Al that has scale-like shape (particles that should become mother particles) was obtained.

Next, the above obtained Al particles are put in 1 mass % propanol solution of $CF_3(CF_2)_4(CH_2)_2O—PO(OH)_2$ as a fluorinated phosphate ester and by stirring it for 10 seconds, the surface preparation was performed by the fluorinated phosphate ester so that the metal powder was obtained. The average grain diameter of the obtained metal powder is 0.8 μm, and the average thickness is 60 nm.

Next, by mixing the metal powder with DISPERBYK-183 (made by BYK Chemie Company) as a dispersant (basic high molecular dispersant) having a polymeric structure in a basic, phenoxyethyl acrylate, Irgacure 819 (made by Chiba• Japan Company) as a photopolymerization initiator, Speedcure TPO (made by ACETO Company) as a photopolymerization initiator, Speedcure DETX (made by Lambson Company) as a photopolymerization initiator, and composition A having a chemical formula shown in formula (6) below, the inkjet composition (ultraviolet-curable composition for inkjet) was obtained.

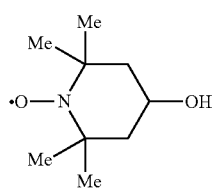

(6)

Examples 2 to 11

The constitution of the metal particles (types of the compounds (fluorinated compound) used for the composition of the mother particles and the surface preparation) is shown in table 1 and table 2. The inkjet compositions (ultraviolet-curable composition for inkjet) in these examples were produced in the same manner as the above described example 1 besides using the compositions as shown in table 1 and table 2 by changing a type of raw materials and ratio used for preparing the inkjet composition (ultraviolet-curable composition for inkjet).

Comparative Example 1

The inkjet composition (ultraviolet-curable composition for inkjet) was produced in the same manner as the above described example 1 besides using particles made by Al, which were not treated by the surface preparation, as a metal powder.

Comparative Example 2

The inkjet composition (ultraviolet-curable composition for inkjet) was produced in the same manner as the above described comparative example 1 besides using a spherical shape of the Al powder (not treated by the surface preparation) as a metal powder produced by using a gas atomization method.

Comparative Example 3

The inkjet composition (ultraviolet-curable composition for inkjet) was produced in the same manner as the above described example 1 besides obtaining the metal powder treated by the surface preparation using $NH_3—(CH_2)_3—Si(OCH_3)_3$, which is not fluorinated silane compound and fluorinated phosphate ester, instead of $CF_3(CF_2)_4(CH_2)_2O—PO(OH)_2$ as a fluorinated phosphate ester.

Comparative Example 4

The inkjet composition (ultraviolet-curable composition for inkjet) was produced in the same manner as the above described example 1 besides not using the basic high molecular dispersant and the content rate of each component as shown in table 2.

Comparative Example 5

The inkjet composition (ultraviolet-curable composition for inkjet) was produced in the same manner as the above described example 1 besides using EMANON 4110 (made by Kao Corporation) as a dispersant, which is not basic, having a polymeric structure instead of the basic high molecular dispersant.

Comparative Example 6

The inkjet composition (ultraviolet-curable composition for inkjet) was produced in the same manner as the above described example 1 besides using NONION P-208 (made by Nichiyu Company) as a dispersant, which is not basic, having a polymeric structure instead of the basic high molecular dispersant.

Regarding the above described examples and comparative examples, the components of the inkjet composition as a whole are shown in table 1 and table 2. In the tables, "S1" represents $CF_3(CF_2)_4(CH_2)_2O—PO(OH)_2$, "S2" represents $CF_3(CF_2)_5—CH_2CH_2—Si(OC_2H_5)_3$, "S3" represents $CF_3—CH_2CH_2—Si(OCH_3)_3$, "S4" represents $CF_3(CF_2)_7—CH_2CH_2—Si(OCH_3)_3$, "S5" represents $CF_3(CF_2)_5(CH_2)_2O—PO(OH)(OC_2H_5)$, "S6" represents $CF_3(CF_2)_5—$ CH$_2$CH$_2$—Si(OCH$_3$)$_3$, "S'1" represents NH$_3$—(CH$_2$)$_3$—Si(OCH$_3$)$_3$, "D1" represents DISPERBYK-183 (made by BYK Chemie Company, amine number: 17 mg KOH/g), "D2" represents DISPERBYK-182 (made by BYK Chemie Company, amine number: 13 mg KOH/g), "D3" represents DISPERBYK-184 (made by BYK Chemie Company, amine number: 15 mg KOH/g), "D4" represents DISPERBYK-116 (made by BYK Chemie Company, amine number 65 mg KOH/g), "D5" represents DISPERBYK-2155 (made by BYK Chemie Company, amine number: 48 mg HOK/g), "D6" represents DISPERBYK-2164 (made by BYK Chemie Company, amine number 14 mg KOH/g), "D7" represents PAA-1112 (made by Nittobo Company), "D'1" represents EMANON 4110 (made by Kao Corporation), "D'2" represents NONION P-208 (made by Nichiyu Company), "PES" represents phnoxyethyl acrylate, "TPGDA" represents tripropylene glycol diacrylate, "DPGDA" represents dipropylene glycol diacrylate, "HPPA" represents 1-hydroxy 3-phenoxypropyl acrylate, "VC" represents N-vinyl caprolactam, "DMTCDDA" represents dimethylol tricyclodecane acrylate, "DMDCPTA" represents dimethylol dicyclopentane diacrylate, "DCPTeA" represents dicyclopentenyl acrylate, "DCPTaA" represents dicyclopentanyl acrylate, "IBA" represents isobornyl acrylate, "AM" represents acryloylmorpholine, "THFA" represents "tetrahydrofurfuryl acrylate", "ECA" represents ethylcarbitol acrylate, "MTEGA" represents methoxytriethylene glycol acrylate, "CHA" represents cyclohexyl acrylate, "TBA" represents t-butyl acrylate, "BA" represents benzyl acrylate, "VEEA" represents acrylate 2-(2-hydroxyethoxy) ethyl, "HBA" represents 4-hydroxybutyl acrylate, "BM" represents benzyl methacrylate, "UA" represents urethane acrylate, "A1" represents a compound (composition A) shown in the above described formula (6), "A2" represents a compound (composition A) shown in the above described formula (7), "A3" represents a compound (composition A) shown in the above described formula (8), "A4" represents a compound (composition A) shown in the above described formula (9), "ic819" represents Irgacure 819 (made by Chiba• Japan Company), "scTPO" represents Speedcure TPO (made by ACETO Company), "scDETX" represents Speedcure DETX (made by Lambson Company), "UV3500" represents UV-3500 (made BKY Chemi Company), and "MEHQ" represents hydroquinone monomethyl ether. Regarding example 9 in the tables, the components of the constituent materials of the mother particles are shown in a ratio by weight for a content rate of each element. Also, by performing the observation for any 10 metal particles included in each inkjet composition, the ratios ($S_1/S_0$) between an area $S_1$ (µm$^2$) (as viewed in a planer view) as viewed in a direction observed from where a profile area becomes maximum and an area $S_0$ (µm$^2$) as viewed in a direction observed from where an area as viewed in a direction perpendicular to an observation direction becomes maximum are calculated and these average values are show in table 1 and table 2. In addition, by using vibration type viscometer, every viscosity of the inkjet compositions (ultraviolet-curable composition for inkjet) in each example measured in reference with J1S Z8809 at 20° was in a range between 3 mPa·s and 15 mPa·s. By the way, D1 to D7 respectively have a polymeric structure in a basic (basic high molecular dispersant).

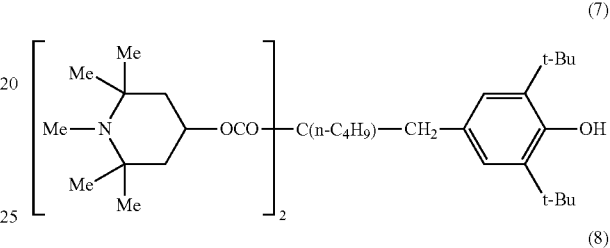

(7)

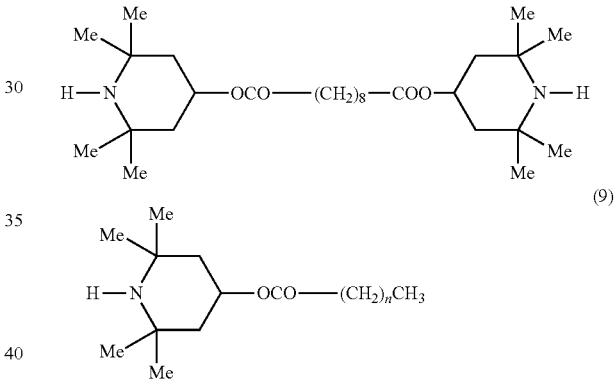

(8)

(9)

(However, the composition A shown in formula (9) is a mixture of a plurality of compositions (main component is a composition that n in the formula is between 15 to 18).)

TABLE 1

| | Constitution of Metal Powder | | Contents of InkJet Composition | | | | | | |
|---|---|---|---|---|---|---|---|---|---|
| | | | Metal Powder | | | Dispersant | | Composition A | |
| Constituent | Material of Mother Particles | Materials Used for Surface Preparation | Shape | Average Grain Diameter (µm) | $S_1/S_0$ | Content Rate (Mass Part) | | Content Rate (Mass Part) | | Content Rate (Mass Part) |
| Example 1 | A1 | S1 | Scale-like | 0.8 | 50 | 2.0 | D1 | 0.16 | A1 | 0.28 |
| Example 2 | A1 | S1 | Scale-like | 0.9 | 39 | 4.0 | D1 | 0.8 | A2 | 0.8 |
| Example 3 | A1 | S1 | Scale-like | 2.0 | 51 | 2.0 | D2 | 1.4 | A1 | 1.4 |
| Example 4 | A1 | S2 | Scale-like | 1.1 | 25 | 2.0 | D3 | 0.4 | A1 | 0.4 |
| Example 5 | A1 | S3 | Scale-like | 1.0 | 29 | 2.0 | D4 | 0..3 | A3 | 0.3 |
| Example 6 | A1 | S4 | Scale-like | 0.7 | 37 | 4.0 | D5 | 0.2 | A1 | 0.2 |
| Example 7 | A1 | S5 | Scale-like | 0.9 | 38 | 2.0 | D6 | 1.2 | A4 | 1.2 |
| Example 8 | A1 | S6 | Scale-like | 1.5 | 21 | 1.0 | D7 | 1.0 | A1 | 1.0 |

TABLE 1-continued

| | | | Contents of InkJet Composition | | |
|---|---|---|---|---|---|
| | | Polymerized Compound | | Other Components | |
| | | | Content Rate (Mass Part) | | Content Rate (Mass Part) |
| Example 1 | PEA | | 87.56 | ic819/scTPO/scDETX | 4.0/4.0/2.0 |
| Example 2 | PEA/TPGDA/DPGDA/VC/IBA/HPPA | | 35.0/35.3/2.0/5.5/4.0/2.2 | ic819/scTPO/scDETX/UV3500/MEHQ | 4.0/4.0/2.0/0.2/0.2 |
| Example 3 | PEA/VEEA/TPGDA/DPGDA/DMTCDDA/AM | | 35.8/32.1/2.0/5.5/4.0/5.6 | ic819/scTPO/scDETX/UV3500 | 4.0/4.0/2.0/0.2 |
| Example 4 | PEA/DCPTeA/DMDCPTA/IBA/HBA | | 36.2/37.5/2.0/9.5/1.6 | ic819/scTPO/xcDETX/UV3500/MEHQ | 4.0/4.0/2.0/0.2/0.2 |
| Example 5 | PEA/VEEA/TPGDA/DPGDA/BM/BA/UA | | 36.2/34.6/1.0/2.0/5.5/4.0/3.9 | ic819/scTPO/UV3500/MEHQ | 4.0/4.0/0.2/0.2 |
| Example 6 | PEA/VEEA/TBA | | 46.8/32.2/10.0 | ic819/scTPO/UV3500/MEHQ | 4.0/2.0/0.2/0.2 |
| Example 7 | PEA/DCPTaA/THFA | | 35.8/39.1/11.5 | ic819/scTPO/scDETX/UV3500/MEHQ | 4.0/4.0/2.0/0.2/0.2 |
| Example 8 | PEA/ECA/MTEGA/CHA/BM | | 36.3/39.8/2.0/5.5/4.0 | ic819/scTPO/scDETX/UV3500/MEHQ | 4.0/4.0/2.0/0.2/0.2 |

TABLE 2

| | Constitution of Metal Powder | | Contents of InkJet Composition | | | | | | |
|---|---|---|---|---|---|---|---|---|---|
| | Constituent | Materials Used | Metal Powder | | | | Dispersant | | Composition A |
| | Material of Mother Particles | for Surface Preparation | Shape | Average Grain Diameter (μm) | $S_1/S_0$ | Content Rate (Mass Part) | | Content Rate (Mass Part) | | Content Rate (Mass Part) |
| Example 9 | Ni49.5Fe50.5 | S4 | Scale-like | 1.8 | 19 | 2.0 | D1 | 0.8 | A2 | 0.8 |
| Example 10 | SUS316L | S5 | Scale-like | 1.5 | 22 | 2.0 | D5 | 0.2 | A1 | 0.2 |
| Example 11 | A1 | S1 + S2 | Scale-like | 0.8 | 50 | 2.0 | D7 | 1.0 | A1 | 1.0 |
| Comp. Example 1 | A1 | — | Scale-like | 0.8 | 50 | 2.0 | D1 | 0.16 | A1 | 0.28 |
| Comp. Example 2 | A1 | — | Spherical | 0.8 | 1 | 2.0 | D1 | 0.16 | A1 | 0.28 |
| Comp. Example 3 | A1 | S'1 | Scale-like | 0.8 | 22 | 2.0 | D1 | 0.16 | A1 | 0.28 |
| Comp. Example 4 | A1 | S1 | Scale-like | 0.8 | 30 | 2.0 | — | — | A1 | 0.28 |
| Comp. Example 5 | A1 | S1 | Scale-like | 0.8 | 55 | 2.0 | D'1 | 0.16 | A1 | 0.28 |
| Comp. Example 6 | A1 | S1 | Scale-like | 0.8 | 6 | 2.0 | D'2 | 0.16 | A1 | 0.28 |

| | | | Contents of InkJet Composition | | |
|---|---|---|---|---|---|
| | | Polymerized Compound | | Other Components | |
| | | | Content Rate (Mass Part) | | Content Rate (Mass Part) |
| Example 9 | PEA/VEEA/TPGDA/DPGDA/AM | | 36.2/39.5/2.0/5.5/4.0 | ic8i19/scTPO/scDETX/UV3500/MEHQ | 4.0.4.0/2.0/0.2/0.2 |
| Example 10 | PEA/VEEA/TPGDA/DPGDA/BM | | 36.2/39.7/2.0/5.5/4.0 | ic819/scTPO/xcDETX/UV3500 | 4.0/4.0/2.0/0.2 |
| Example 11 | PEA/VEEA/DPGDA | | 35.8/39.1/11.5 | ic819/scTPO/scDETX/UV3500/MEHQ | 4.0/4.0/2.0/0.2/0.2 |
| Comp. Example 1 | PEA | | 87.56 | ic819/scTPO/scDETX | 4.0/4.0/2.0 |

TABLE 2-continued

| | | | | |
|---|---|---|---|---|
| Comp. Example 2 | PEA | 87.56 | ic819/scTPO/scDETX | 4.0/4.0/2.0 |
| Comp. Example 3 | PEA | 87.56 | ic819/scTPO/scDETX | 4.0/4.0/2.0 |
| Comp. Example 4 | PEA | 87.72 | ic819/scTPO/scDETX | 4.0/4.0/2.0 |
| Comp. Example 5 | PEA | 87.56 | ic819/scTPO/scDETX | 4.0/4.0/2.0 |
| Comp. Example 6 | PEA | 87.56 | ic819/scTPO/scDETX | 4.0/4.0/2.0 |

(2) Stability Evaluation of Droplet Discharge

Discharge Stability Evaluation

By using the inkjet compositions in the respective above described examples and comparative examples, the following test was performed. First of all, a droplet discharge device equipped in a chamber (thermal chamber) and the inkjet compositions in the respective examples and comparative examples as described above were prepared. In a condition that the drive waveform of piezo-element was optimized, the respective inkjet compositions were dropped 2000000 times (2000000 drops) from each nozzle of the droplet discharge heads under the environment of 25° C., 55% RH so the sequence discharge of droplet was performed. After that, the droplet discharge device was turned off, and it was left for 240 hours in a condition that the respective inkjet compositions were filled in a flow channel of the droplet discharge device under the environment of 25° C., 55% RH. After that, the droplet was sequentially performed 4000000 times (4000000 drops) from each nozzle of the droplet discharge heads under the environment of 25° C., 55% RH. After it was left for 150 hours, regarding the droplets of 4000000 times discharged from the nozzles specified in a peripheral central part of the droplet discharge heads, an average value of shift amount d, which was shifted from a central position that the respective droplets were targeted to land, was calculated so that the evaluation was made in accordance with 5 stages standard below. As this value becomes smaller, it can be said that an occurrence of a flying curve was prevented.

A: the average of shift amount d is less than 0.07 μm.
B: the average of shift amount d is more than 0.07 μm and less than 0.14 μm.
C: the average of shift amount d is more than 0.14 μm and less than 0.17 μm.
D: the average of shift amount d is more than 0.17 μm and less than 0.21 μm.
E: the average of shift amount d is more than 0.21 μm.

(3) Frequency Property of Inkjet Composition

A droplet discharge device equipped in a chamber (thermal chamber) and the inkjet compositions in the respective examples and comparative examples as described above were prepared. In a condition that the drive waveform of piezo-element was optimized, the droplet discharge was performed by changing the frequency of vibration (frequency) of the piezo-elements in all nozzles of the droplet discharging heads under the environment of 25° C., 55% RH. The droplet discharge time in the frequency was 10 minutes. At the point after discharging for 10 minutes, a frequency that numbers of non-discharged nozzles were less than 1% in all nozzle numbers is an actual usable maximum frequency so that the evaluation was made in an actual usable frequency range in accordance with 4 stages standard below. As this value becomes larger, it has an excellent frequency property.

A: more than 15 kHz.
B: more than 10 kHz and less than 15 kHz.
C: more than 5 kHz and less than 10 kHz.
D: less than 5 kHz.

(4) Storage Stability Evaluation of Inkjet Composition

Long Term Stability Evaluation

Regarding the respective examples and comparative examples as described above, after 40 days left under the environment of 40° C., by using the vibration type viscometer, the viscosity of the inkjet compositions in each example measured in reference with JIS Z8809 at 20° C. was measured so as to calculate the percentage of rise of viscosity immediate after the production and the evaluation was made in accordance with standards below.

A: the percentage of rise of viscosity is less than 5%.
B: the percentage of rise of viscosity is more than 5% and less than 10%.
C: the percentage of rise of viscosity is more than 10% and less than 18%.
D: the percentage of rise of viscosity is more than 18% and less than 23%.
E: the percentage of rise of viscosity is more than 23% or a generation of a foreign object is recognized.

(5) Hardenability

Regarding the inkjet compositions of the respective examples and comparative examples as described above, the solid printing was performed by using EPSON Inkjet Printer; PM800C, DIAFOIL G440E made by Mitsubishi Plastic Corporation as a recording medium (thickness 38 μm), and ink amount wet 9 g/m$^2$. The ultraviolet light was irradiated by using LED-U lamp; RX Firefly made by Phoseon Inc. (gap 6 mm, peak wave 365 nm, 1000 mW/cm$^2$) immediate after the printing, and it confirmed whether or not the inkjet composition was hardened. The evaluation was made in accordance with 5 stages standard below. To determine whether or not it was hardened, a surface was scratched by a cotton swab. The determination was made by a result of whether or not uncured inkjet composition was adhered to the cotton swab. To determine which irradiance levels A to E below are applied, it was calculated depending on how many seconds the lamp irradiated.

A: It was hardened by the ultraviolet irradiance level less than 100 mJ/cm$^2$.

B: It was hardened by the ultraviolet irradiance level more than 100 mJ/cm$^2$ and less than 200 mJ/cm$^2$.

C: It was hardened by the ultraviolet irradiance level more than 200 mJ/cm$^2$ and less than 500 mJ/cm$^2$.

D: It was hardened by the ultraviolet irradiance level less than 1000 mJ/cm$^2$.

E: It was hardened by the ultraviolet irradiance level more than 1000 mJ/cm$^2$ or it was not hardened at all.

(6) Production of Recording Material

By using the inkjet compositions of the respective examples and the comparative examples, an interior panel as a recording material was provided as follows. First of all, the inkjet compositions were put in the inkjet apparatus. After that, the inkjet compositions were discharged in a predetermined pattern on a base material (recording medium) having a curving surface part that was formed by using polycarbonate (made by Asahi Glass Co., Ltd., CARBOGLASS PLISH 2 mm thickness).

After that, the interior panel as a recording material was obtained by hardening the inkjet compositions on the base material. The inkjet compositions were hardened by irradiating ultraviolet light, which has a maximum value of spectrum at 365 nm, 380 nm, and 395 nm wavelengths, at 180 mW/cm$^2$ of the irradiation intensity for 15 seconds. By using the above described method and by using the inkjet compositions of the respective examples and the comparative examples, 10 interior panels (recording materials) were provided, respectively.

Also, in the same manner, 10 interior panels (recording materials) were provided by using the inkjet compositions of the respective examples and the comparative examples besides using polyethylene terephthalate (made by Mitsubishi Plastic, Inc., DIAFOIL G440E 38 μm thickness) used to form as a base material, low-density polyethylene (made by Mitsui Chemicals Tohcell, Inc., T.U.S. (L-LDPE) HC-E #80) used to form as a base material, biaxially oriented polypropylene (made by Mitsui Chemicals Tohcell, Inc., OP U-1 #60) used to form as a base material, and hard vinyl chloride (made by Acrysunday Co., Ltd., SUNDAY SHEET (transparent) 0.5 mm thickness) used to form as a base material.

(7) Evaluation of Recording Material

The respective above obtained recording materials were evaluated as follows.

(7.1) Appearance Evaluation of Recording Materials

The respective recording materials provided in the respective examples and the comparative examples were visually evaluated in accordance with 7 stages standard below.

A: Extremely excellent appearance with a full of rich glossy appearance.

B: Excellent appearance with a full of rich glossy appearance.

C: Very good appearance with a rich glossy appearance.

D: Good appearance with a rich glossy appearance.

E: Slightly not-good appearance with an insufficient glossy appearance.

F: Not-good appearance with a weak glossy appearance.

G: Extremely not-good appearance with a weak glossy appearance.\

(7.2) Degree of Glossiness

Regarding the pattern forming parts of the respective recording materials provided in the respective examples and comparative examples, by using the degree of glossiness (MINOLTA MULTI GLOSS 268), the degree of the glossiness measured in a flap angle 60° was evaluated in accordance with standards below.

A: Degree of glossiness more than 400.

B: Degree of glossiness more than 300 and less than 400.

C: Degree of glossiness more than 200 and less than 300.

D: Degree of glossiness less than 200.

(7.3) Abrasion Resistance

Regarding the recording materials related to the respective examples and comparative examples, the abrasion resistance test using polyethylene terephthalate film (Mitsubishi Plastic, Inc., DIAFOILG440E) was performed by using Sutherland rub tester in reference with JIS K5701 when 48 hours elapsed from the production of the recording materials. In the same method as discussed above (7.2), the degree of glossiness (flap angle 60°) for the recording materials was measured after the abrasion resistance test, and a decreasing rate of the degree of glossiness after the abrasion resistance test was calculated for the evaluation in accordance with standards below.

A: A decreasing rate of the degree of glossiness is less than 5%.

B: A decreasing rate of the degree of glossiness is more than 5% and less than 13%.

C: A decreasing rate of the degree of glossiness is more than 13% and less than 23%.

D: A decreasing rate of the degree of glossiness is more than 23% and less than 27%.

E: A decreasing rate of the degree of glossiness is less than 27% or the surface of the recording medium is exposed because the metal particles were come off.

These results are shown in table 3. In table 2, M1 represents a recording material provided by using a base material of polycarbonate, M2 represents a recording material provided by using a base material of polyethylene terephthalate, M3 represents a recording material provided by using a base material of low density polyethylene, M4 represents a recording material provided by using a base material of biaxially oriented polypropylene, and M5 represents a recording material provided by using a base material of hard vinyl chloride.

TABLE 3

| | Discharge Stability | Frequency Characteristic | Long-Term Stability | Hardenability | Appearance of Recording Material | | | | | Degree of Glossiness | | | | | Abrasion Resistance | | | | |
|---|---|---|---|---|---|---|---|---|---|---|---|---|---|---|---|---|---|---|---|
| | | | | | M1 | M2 | M3 | M4 | M5 | M1 | M2 | M3 | M4 | M5 | M1 | M2 | M3 | M4 | M5 |
| Example 1 | A | A | A | A | A | A | A | A | A | A | A | A | A | A | A | A | A | A | A |
| Example 2 | A | A | A | A | A | A | A | A | A | A | A | A | A | A | A | A | A | A | A |
| Example 3 | A | A | A | A | A | A | A | A | A | A | A | A | A | A | A | A | A | A | A |
| Example 4 | B | A | B | A | A | A | A | A | A | B | B | B | B | B | A | A | A | A | A |
| Example 5 | A | A | A | A | A | A | A | A | A | A | A | A | A | A | A | A | A | A | A |
| Example 6 | B | A | B | A | A | A | A | A | A | B | B | B | B | B | A | A | A | A | A |
| Example 7 | A | A | A | A | A | A | A | A | A | A | A | A | A | A | A | A | A | A | A |
| Example 8 | B | A | B | A | A | A | A | A | A | B | B | B | B | B | B | B | B | B | B |
| Example 9 | B | B | A | A | A | A | A | A | A | B | B | B | B | A | A | A | A | A | A |
| Example 10 | B | B | A | A | A | A | A | A | A | B | B | B | B | B | A | A | A | A | A |
| Example 11 | A | A | A | A | A | A | A | A | A | A | A | A | A | A | A | A | A | A | A |
| Comp. Example 1 | E | D | E | A | F | F | F | F | F | C | C | C | C | C | C | C | C | C | C |
| Comp. Example 2 | D | C | D | A | G | G | G | G | G | D | D | D | D | D | C | C | C | C | C |
| Comp. Example 3 | D | C | C | A | E | E | E | E | E | C | C | C | C | C | C | C | C | C | C |
| Comp. Example 4 | C | D | C | A | E | E | E | E | E | C | C | C | C | C | C | C | C | C | C |
| Comp. Example 5 | C | D | C | A | E | E | E | E | E | B | B | B | B | B | B | B | B | B | B |
| Comp. Example 6 | C | D | C | A | E | E | E | E | E | B | B | B | B | B | B | B | B | B | B |

As is clear from table 3, the ultraviolet-curable compositions for inkjet in the present invention had excellent discharge stability of droplet, excellent storage stability, and excellent hardenability. Also, the recording materials of the present invention had excellent glossy appearance, and the pattern forming parts had excellent abrasion resistance. On the other hand, the sufficient results were not obtained in the comparative examples.

What is claimed is:

1. An ultraviolet-curable composition for inkjet adapted to be discharged by an inkjet method comprising:
   a polymerized compound;
   a metal powder; and
   a dispersant,
   wherein the metal powder is treated by a surface preparation with a fluorinated silane compound and/or a fluorinated phosphate ester as a surface preparation agent, and the dispersant has a polymeric structure in a basic.

2. The ultraviolet-curable composition for inkjet according to claim 1, wherein
   the metal powder mainly constituting Al on at least a surface is treated by the surface preparation with the fluorinated silane compound and/or the fluorinated phosphate ester.

3. The ultraviolet-curable composition for inkjet according to claim 1, wherein
   the metal powder has a scale-like shape.

4. The ultraviolet-curable composition for inkjet according to claim 1, wherein
   the metal powder is treated by the surface preparation in the fluorinated silane compound having a chemical structure shown in formula (1) below $$R^1 SiX^1_a R^2_{(3-a)} \quad (1)$$

wherein, in formula (1), $R^1$ represents a hydrocarbon group in which a part or all of hydrogen atoms are substituted by fluorine atoms, $X^1$ represents hydrolysis group, ether group, chloro group or hydroxyl group, $R^2$ represents alkyl group having a carbon number 1 to 4, and a represents an integer between 1 to 3.

5. The ultraviolet-curable composition for inkjet according to claim 1, wherein
   the metal powder is treated by the surface preparation in the fluorinated phosphate ester having a chemical structure shown in formula (2) below $$POR_n(OH)_{3-n} \quad (2)$$

wherein, in formula (2), R represents $CF_3(CF_2)_m-$, $CF_3(CF_2)_m(CH_2)_l-$, $CF_3(CF_2)_m(CH_2O)_l-$, $CF_3(CF_2)_m(CH_2CH_2O)_l-$, $CF_3(CF_2)_mO-$, or $CF_3(CF_2)_m(CH_2)_lO-$, n represents an integer between 1 to 3, m represents an integer between 2 to 18, and l represents an integer between 1 to 18.

6. The ultraviolet-curable composition for inkjet according to claim 1, wherein
   the surface preparation agent has a perfluoroalkyl structure.

7. The ultraviolet-curable composition for inkjet according to claim 1, wherein
   an average grain diameter of the metal powder is more than 500 nm and less than 3.0 μm.

8. The ultraviolet-curable composition for inkjet according to claim 1, wherein
   the polymerized compound includes phenoxyethyl acrylate.

9. The ultraviolet-curable composition for inkjet according to claim 8, wherein
   in addition to phenoxyethyl acrylate, the polymerized compound includes at least one selected from a group comprising 2-(2-vinyloxyethoxy)ethyl acrylate, dipropylene glycol diacrylate, tripropylene glycol diacrylate, 2-hydroxy-3-phenoxypropyleacrylate, and 4-hydroxybutylacrylate.

10. The ultraviolet-curable composition for inkjet according to claim 1, wherein
    the polymerized compound includes at least one selected from a group comprising dimethylol tricyclodecane diacrylate, dimethylol dicyclopentane diacrylate, dicyclopentenyl acrylate, dicyclopentanyl acrylate, isobornyl acrylate, acryloylmorpholine, tetrahydrofurfuryl acrylate, cyclohexyl acrylate, isobutyl acrylate, t-butyl acrylate, benzyl acrylate, ethylcarbitol acrylate, and methoxy triethylene glycol acrylate.

11. The ultraviolet-curable composition for inkjet according to claim 1, further comprising
a composition A having a part structure shown in formula (5) below

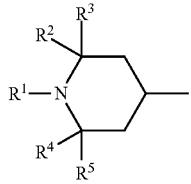
(5)

Wherein, in formula (5), $R^1$ represents hydrogen atom, hydrocarbon group, alkoxy group, or oxygen radical, and $R^2$, $R^3$, $R^4$, and $R^5$ respectively and independently represent hydrogen atoms or hydrocarbon group.

12. The ultraviolet-curable composition for inkjet according to claim 1, wherein
a relationship of $0.01 \leq X_A/X_M \leq 0.8$ is satisfied when a content percentage of the composition A is $X_A$ (mass %) and a content percentage of the metal powder is $X_M$ (mass %).

13. A recording material produced by irradiating ultraviolet light onto a recording medium after the ultraviolet-curable inkjet composition according to claim 1 has been applied on the recording medium.

* * * * *